Figure 1:
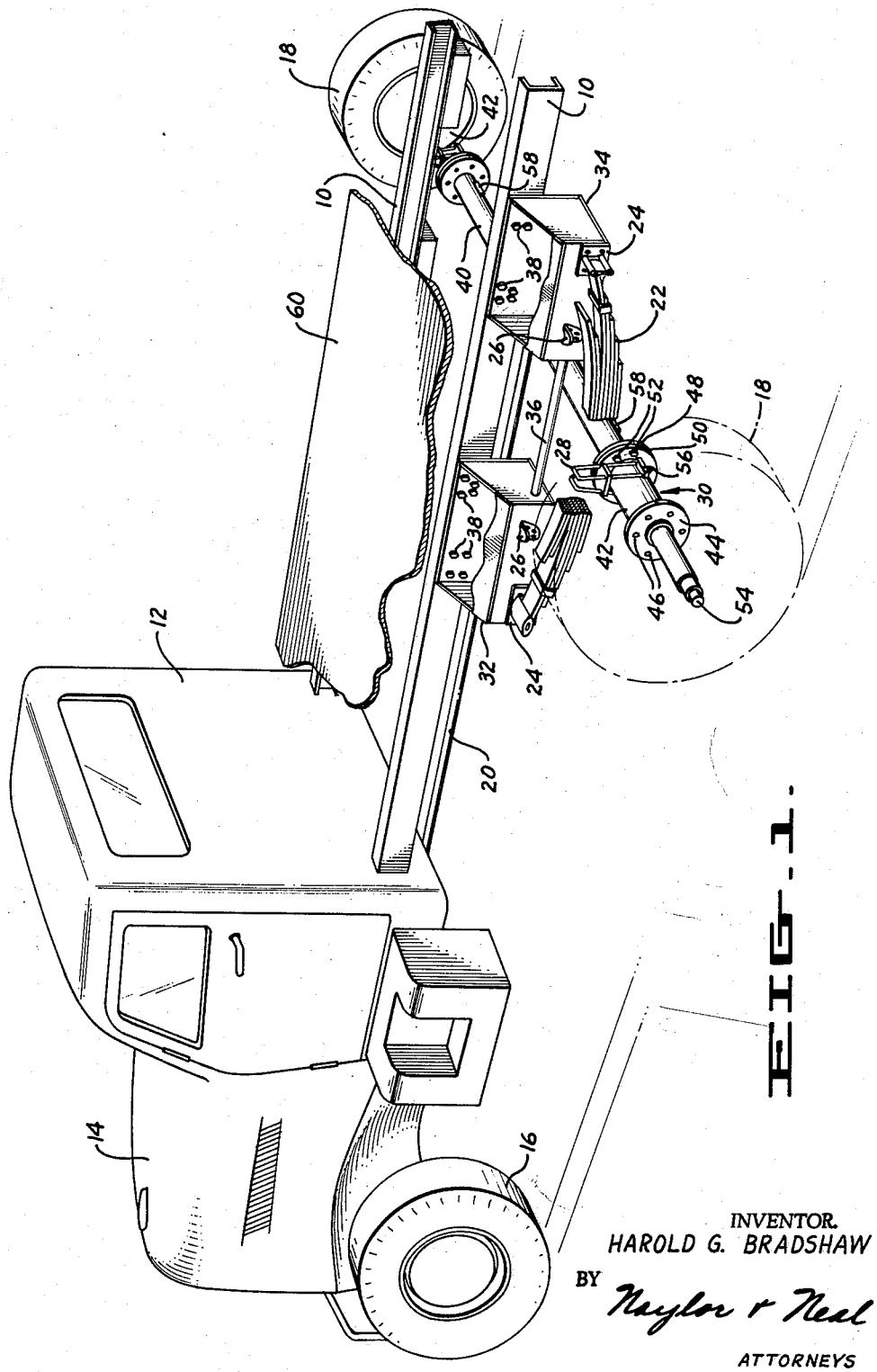

Feb. 23, 1965     H. G. BRADSHAW     3,170,704
WIDE WHEEL-BASE TRUCK
Filed April 27, 1962

INVENTOR.
HAROLD G. BRADSHAW
BY *Naylor & Neal*
ATTORNEYS

United States Patent Office 3,170,704
Patented Feb. 23, 1965

3,170,704
WIDE WHEEL-BASE TRUCK
Harold G. Bradshaw, Salinas, Calif., assignor to Cochran Equipment Company, Salinas, Calif., a corporation of California
Filed Apr. 27, 1962, Ser. No. 190,704
5 Claims. (Cl. 280—34)

This invention relates to trucks and more particularly to wide wheel-base trucks adapted for agriculture use.

Wide wheel-base trucks are currently used in a number of off-highway situations such as in the harvesting of agricultural crops. Trucks of this kind are used for harvesting lettuce where the wide wheel-base is employed to adapt the truck to the spacing between rows of lettuce and to provide a large area truck bed for carrying light weight bulky loads. While wide wheel-base trucks of this type are used in substantial quantity, they are still classified as specialty equipment and are sold in a limited market. A lettuce truck for instance is a very useful vehicle to a lettuce grower but when the truck has been used for several seasons and the grower wishes to replace it, purchasers for the used lettuce truck are much more difficult to find than would be purchasers for an ordinary used truck of conventional design.

It is a principal object of this invention to provide a wide wheel-base truck which is readily adapted for use as a lettuce truck or the like where the truck will be more salable after substantial use than lettuce trucks normally are.

It is another object of this invention to provide a wide wheel-base truck which may be converted very easily into a truck of standard wheel-base.

It is another object of this invention to provide such a wide wheel-base truck in which the truck chassis is supported on conventional springs and in which both the wheels and springs are spaced apart by distances greater than the corresponding distances in conventional trucks so that the trucks may be provided with wide load carrying beds, and off-centered loads can be carried on the beds without imparting substantial tipping moments to the truck.

Other objects and advantages of the invention will become apparent from the following description read in conjunction with the attached drawings in which:

FIG. 1 is a perspective view partially broken away of a truck constructed in accordance with this invention.

The truck illustrated in the drawing comprises a chassis having a pair of elongated frame members 10, a driver's cab 12, a hood 14 covering a motor, front steerable wheels 16, rear drive wheels 18, and a drive shaft 20. The rear wheels 18 are supported on the frame members 10 by heavy duty truck springs 22 which carry end brackets 24 and auxiliary brackets 26. A hanger assembly 28 connects the spring to a rear axle assembly indicated generally at 30, and the rear wheels 18 are mounted on the axle assembly 30 by conventional means.

The springs 22 are positioned outwardly from the frame members 10 by chassis extension units which include forward and rearward box portions 32 and 34 respectively connected together by a tide bar 36. The brackets 24 and 26 for each spring 22 are removably attached to the box portions of one of the chassis extension units by removable bolts, and each chassis extension unit is attached to one of the frame members 10 by a second group of removable bolts which are arranged in a pattern (indicated at 38) which is identical to the pattern of bolts by which the brackets 24 and 26 are attached to the chassis extension units.

The rear axle assembly 30 includes a central portion 40 and axle extension portions 42 on the outer ends of the central portion 40. The axle extension portions have outer ends 44 on which the rear wheels 18 are mounted by means of standard brake assembly units mounted in each wheel 18; the outer ends 44 of the axle extensions 42 are removably attached to each wheel assembly by bolts received in holes 46. The outer end 48 of the central portion 40 of the axle assembly has the same shape as the outer end 44 of the axle extensions 42, and the inner ends 50 of the axle extensions 42 have the same shape as the mounting means which are carried by each wheel 18 for mounting the wheel on the axle assembly 30. The outer ends 48 of the central axle portion and the inner ends 50 of the axle extensions are removably attached together by means of bolts 52. An axle 54 extends through the axle assembly 30 for driving the rear wheels 18, and the axle 54 may be constructed as a long integral axle or as a main axle portion extending through the central axle portion 40 with outer removable segments mounted in the axle extensions 42 and keyed to the inner segment.

It should be noted that each spring hanger 28 is attached to an axle extension unit 42 by means of a boss 56, and a similar boss 58 is provided on the central axle portion 40 inwardly from the outer end 48 thereof.

This construction for the mounting of the rear axle assembly 30 of the truck provides a wide wheel-base for the truck and wide spring support between the axle assembly 30 and truck chassis so that tipping moments on the truck chassis are reduced when off-center loads are mounted on a wide load carrying bed 60 on the truck. Similar means may be employed for mounting the front wheels 16 of the truck on a wide wheel-base, though the mounting for the front wheel should also include suitable means for shortening the steering arms by which the front wheels 16 are steered so that the wide wheel-base truck may be converted to a truck of standard wheel-base.

When a truck constructed in accordance with FIG. 1 has been used as a lettuce truck or the like for several seasons and the owner of the truck wishes to sell it as a used truck, the owner of the truck may convert it into a truck of standard wheel-base so that the truck will be salable in a larger market than the market for used lettuce trucks. This conversion may be accomplished by removing the bolts in brackets 24 and 26, removing the bolts in the pattern 38 by which the chassis extension units are attached to the frame members 10, and then attaching the brackets 24 and 26 directly to the frame members 10 at the pattern of holes 38. The hangers 28 are removed from the bosses 56 on the axle extensions 42 and attached to the bosses 58 on the central portion 40 of the axle housing. The rear wheels 18 are removed from the axle assembly by removing the bolts in holes 46; the bolts 52 by which the axle extensions 42 are attached to the central axle portion 40 are removed, and the rear wheels 18 are then mounted directly on the outer ends 48 of the central portion 40 of the rear axle with the bolts which were received in holes 46 being received in the holes in which bolts 52 were mounted. In this regard, the difference between the distance separating the mounting means 24 on opposite sides of the truck minus the distance separating the mounting holes 38 constitutes a predetermined distance by which the spring support base of the truck may be reduced, and each of the axle housing extensions 42 has a length equal to one-half of this predetermined distance so that the wheel-base of the truck is reduced by the same amount as the spring support base. Accompanying this removal of the extension sections 42 of the axle assembly, the axle 54 is shortened by removing the extension portions thereof in the axle extensions 42 or by completely replacing the axle 54 with a shorter axle. Where the axle 54 is to be replaced completely, the entire axle assembly 30 including the differential in the central portion 40 thereof is preferably constructed to take a full floating axle.

While one specific embodiment of this invention has been illustrated and described in detail herein, it is obvious that many modifications thereof may be made without departing from the spirit and scope of the invention.

I claim:

1. In a truck having a chassis with laterally spaced apart frame portions, spring means removably mounted on said frame portions, axle housing means resiliently mounted on said chassis by said spring means, wheel assemblies adjacent to said axle housing means, and inner and outer mounting means on said axle housing means and said wheel assemblies respectively for mounting said wheel assemblies on said axle means; the improved means for providing a wide wheel-base for said truck which comprises axle housing extension means removably connected between each of said inner and outer mounting means and having outer and inner mounting portions which are similar to said inner and outer mounting means respectively with said axle housing extension means rigidly connected to said axle housing for resilient nonrotatable movement therewith, chassis extension means positioned between said frame portions and said spring means, and inner and outer connector means arranged in the same pattern and removably connecting said chassis extension means to said frame portions and said spring means respectively with said spring means engaging said axle housing extension.

2. The improved truck of claim 1 characterized further by the inclusion of hanger means connecting said spring means to said axle extension means and adapted to connect said springs to said axle means when said springs are directly connected to said frame portions.

3. A wide wheel-base truck comprising a chassis having a frame with laterally spaced apart frame portions at its sides and a pair of frame extension units removably mounted on said frame portions, first removable attachment means arranged in a predetermined pattern and connecting each of said extension units to one of said frame portions, a pair of removable springs, second removable attachment means arranged in said predetermined pattern and connecting one of said springs to each of said extension units with said second atachment means spaced apart by a distance which exceeds by a predetermined distance the distance between said first attachment means, an axle housing, a pair of spaced apart hanger means with one of said hanger means connecting each of said springs to said axle housing, and a pair of wheels having mounting means supporting said wheels on opposite ends of said axle housing, said axle housing having a central portion and removable extension portions mounted on its opposite ends with all of said portions having outer ends adapted to receive said mounting means on said wheels and with the distance between the outer ends of each of said extension portions and the adjacent outer end of said central portion being substantially one-half of said predetermined distance.

4. The truck of claim 3 characterized further in that said hanger means connect said springs to said extension portions of said axle housing and are adapted to connect said springs to said central portion of said axle housing when said springs are connected directly to said frame portions.

5. The truck of claim 3 characterized further by the inclusion of a prime-mover mounted on said chassis and axle means in said axle housing connecting said prime-mover to said wheels for driving said wheles.

References Cited in the file of this patent

UNITED STATES PATENTS

| 1,822,093 | Hendrickson et al. | Sept. 8, 1931 |
| 2,400,505 | Hedglen | May 21, 1946 |
| 2,819,117 | Glazier | Jan. 7, 1958 |